US012145009B2

(12) United States Patent
Voss et al.

(10) Patent No.: US 12,145,009 B2
(45) Date of Patent: Nov. 19, 2024

(54) DAVIT ASSEMBLY

(71) Applicant: SAYFA R&D PTY LTD, Boronia (AU)

(72) Inventors: Murray Voss, Boronia (AU); Barry Voss, Boronia (AU)

(73) Assignee: SAYFA R&D PTY LTD, Boronia (AU)

(*) Notice: Subject to any disclaimer, the term of this patent is extended or adjusted under 35 U.S.C. 154(b) by 572 days.

(21) Appl. No.: 17/450,090

(22) Filed: Oct. 6, 2021

(65) Prior Publication Data

US 2022/0193470 A1 Jun. 23, 2022

Related U.S. Application Data

(63) Continuation of application No. PCT/AU2021/051000, filed on Aug. 30, 2021.

(30) Foreign Application Priority Data

Dec. 23, 2020 (AU) ................................ 2020104271

(51) Int. Cl.
*A62B 35/00* (2006.01)
*G08B 21/18* (2006.01)

(52) U.S. Cl.
CPC ........ *A62B 35/0068* (2013.01); *G08B 21/182* (2013.01)

(58) Field of Classification Search
CPC ....... A62B 35/0068; A62B 1/06; B66C 23/16; B66C 23/166; B66C 23/202; B66C 23/208; B66C 23/485; B66C 23/66; B66C 23/701; E04G 23/002
See application file for complete search history.

(56) References Cited

U.S. PATENT DOCUMENTS 2,557,852 A * 6/1951 Winkel ................. B66C 23/202 212/223
2,877,905 A * 3/1959 Wiley ....................... B66C 9/14 16/338
3,358,849 A 12/1967 Becker
(Continued)

FOREIGN PATENT DOCUMENTS

CN 205527407 U 8/2016
CN 205527411 U 8/2016
(Continued)

OTHER PUBLICATIONS

"RAPTOR davit rigid rail systems installed at Clifton Views and BMW allow access for maintenance without damaging the fragile facades" Retrieved from the internet on Aug. 26, 2020—https://sayfa.com.au/providing-safeaccess-for-facade-maintenance/.
(Continued)

*Primary Examiner* — Emmanuel M Marcelo
(74) *Attorney, Agent, or Firm* — INNOVATION CAPITAL LAW GROUP, LLP; Vic Lin

(57) ABSTRACT

A davit assembly comprises a vertical structural column connecting a horizontal structural beam between a longer forward beam portion and a shorter rearward beam portion thereof, an angled support brace tensioned between a lower region of the structural column and an end of the shorter rearward beam portion and a primary rigging anchor slidably engaging the forward beam portion.

43 Claims, 8 Drawing Sheets

(56) References Cited

U.S. PATENT DOCUMENTS

| | | | | | |
|---|---|---|---|---|---|
| 4,508,233 | A | | 4/1985 | Helms | |
| 4,688,688 | A | | 8/1987 | Volakakis et al. | |
| 5,052,566 | A | | 10/1991 | Ziegler | |
| 5,673,843 | A | * | 10/1997 | Gainey | B23K 37/0533 269/902 |
| 9,360,816 | B1 | | 6/2016 | Mabuchi et al. | |
| 9,630,816 | B1 | | 4/2017 | Napieralski et al. | |
| 11,142,436 | B1 | * | 10/2021 | Napieralski | F16M 11/26 |
| 11,352,239 | B1 | * | 6/2022 | Spitsbergen | B66C 23/203 |
| 11,453,578 | B1 | * | 9/2022 | Napieralski | B66C 23/706 |
| 2003/0039531 | A1 | * | 2/2003 | Bickle | E04G 21/16 254/338 |
| 2003/0071004 | A1 | * | 4/2003 | Higgins | B66C 23/701 212/292 |
| 2007/0227995 | A1 | * | 10/2007 | Casebolt | B66C 23/16 212/179 |
| 2016/0271430 | A1 | * | 9/2016 | Baughman | F16M 11/42 |
| 2022/0097805 | A1 | * | 3/2022 | Maher | B66C 5/06 |
| 2024/0025711 | A1 | * | 1/2024 | Mattoli | B66C 23/44 |
| 2024/0043249 | A1 | * | 2/2024 | Ratalino | B66C 23/205 |
| 2024/0124273 | A1 | * | 4/2024 | Givens | B66C 23/027 |

FOREIGN PATENT DOCUMENTS

| | | | | | |
|---|---|---|---|---|---|
| CN | 111606220 | A | * | 9/2020 | |
| DE | 4036701 | A | * | 5/1992 | B66C 23/202 |
| DE | 202008001827 | U1 | * | 5/2008 | A62B 1/06 |
| EP | 2088113 | A2 | | 8/2009 | |
| EP | 4317045 | A1 | * | 2/2024 | B66C 23/166 |
| ES | 2740781 | T3 | * | 2/2020 | B66C 1/10 |
| GB | 2408038 | A | * | 5/2005 | B60P 1/5433 |
| JP | 2011241058 | A | | 12/2011 | |
| WO | 2003078293 | A1 | | 9/2003 | |
| WO | 2020210858 | A1 | | 10/2020 | |

OTHER PUBLICATIONS

Australia Examination Report dated May 27, 2021 from Australia Application No. 2020104271.

Skyline Fall Protection; URL: https://skylinefp.com/products/davits-rigging-sleeves/ accessed on Jan. 23, 2018.

International Search Report & Written Opinion dated Dec. 7, 2021 from PCT Application No. PCT/AU2021/051000.

Examination Report dated May 18, 2023 from GB Application No. GB2114009.0.

* cited by examiner

146

| 2 input AND gates | | |
|---|---|---|
| Sensor 1 (143) | Sensor 2 (142) | Output |
| 0 | 0 | 0 |
| 0 | 1 | 0 |
| 1 | 0 | 0 |
| 1 | 1 | 1 |

DAVIT ASSEMBLY

FIELD OF THE INVENTION

This invention relates generally to a davit assembly for elevated rope access building construction and maintenance work.

BACKGROUND OF THE INVENTION

Davit systems are designed as a cantilevered anchorage device over non-loadbearing balustrades, parapets and curtain walls for rope access work where workers are required to construct and maintain building façades and equipment mounted on the external face of a structure. Davit systems are engineered single person devices mostly connected to the primary structure of the building including floor and wall mount options depending on the structure available and the intended use of the system.

The davit base may be permanently mounted to the structure whilst the davit arm device is relocated from base to base in order to access different sections of the structure or façade.

As these systems are required to safely suspend a human life, the system must only be used by a certified rope access operator. Care of the system along with periodic maintenance and recertification of the davit arm and base is required at a minimum of 12 monthly intervals to ensure compliance with relevant standards, and that there is no failure or breakdown of the structure or the system components.

The present invention seeks to provide a davit assembly, which will overcome or substantially ameliorate at least some of the deficiencies of the prior art, or at least to provide an alternative.

It is to be understood that, if any prior art information is referred to herein, such reference does not constitute an admission that the information forms part of the common general knowledge in the art.

SUMMARY OF THE DISCLOSURE

There is provided herein a davit assembly designed as a lightweight high-strength rope access system facilitating the ease of setting up and providing safety when relocated between different mounting points.

The davit assembly comprises a vertical structural column connecting to a horizontal structural beam between a longer forward beam portion and a shorter rearward beam portion thereof. A rearward angled support brace is tensioned between a lower region of the structural column and an end of the shorter rearward beam portion. Safety mounting devices securely and releasably engaging the components are provided to ensure failsafe attachment of the column and beam, support brace and the mounting base. A primary rigging anchor is provided to slidably engage along the longer forward beam portion.

The assembly may offer heights at least 1600 mm clearance and 800 mm of reach and mounting bases of various configurations may be provided to suit specific applications. The maximum recommended single person load of the assembly may be 250 kg and the structural beam may rotate and operate at varying degrees with total active angle of 130°.

The structural beam and column may be manufactured from aluminium extrusions and a structural connector therebetween may be made of high tensile stainless steel, thereby designed to support and lift or lower the significant cantilevered load applied to the rigging anchor.

The structural beam and column may further comprise cross-sections designed and engineered to resist the significant torsional and bending loads applied during use. Furthermore, the cross-section of the structural column may allow positional rotation within a cylindrical engagement of a mounting base provided therefor.

The structural beams and column may be securely held together by means of a common safety locking pin thereby facilitating ease of assembly and disassembly. Each safety locking pin may comprise a secondary security locking ring pin.

Various floor mounting bases are provided, including for concrete cast-in a low-profile surface, floor and wall options.

The assembly may further incorporate a safety monitoring system which monitors bending and load forces applied to the structural beam to alert the operator in the event of overload or unsafe operation of the assembly.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 1:
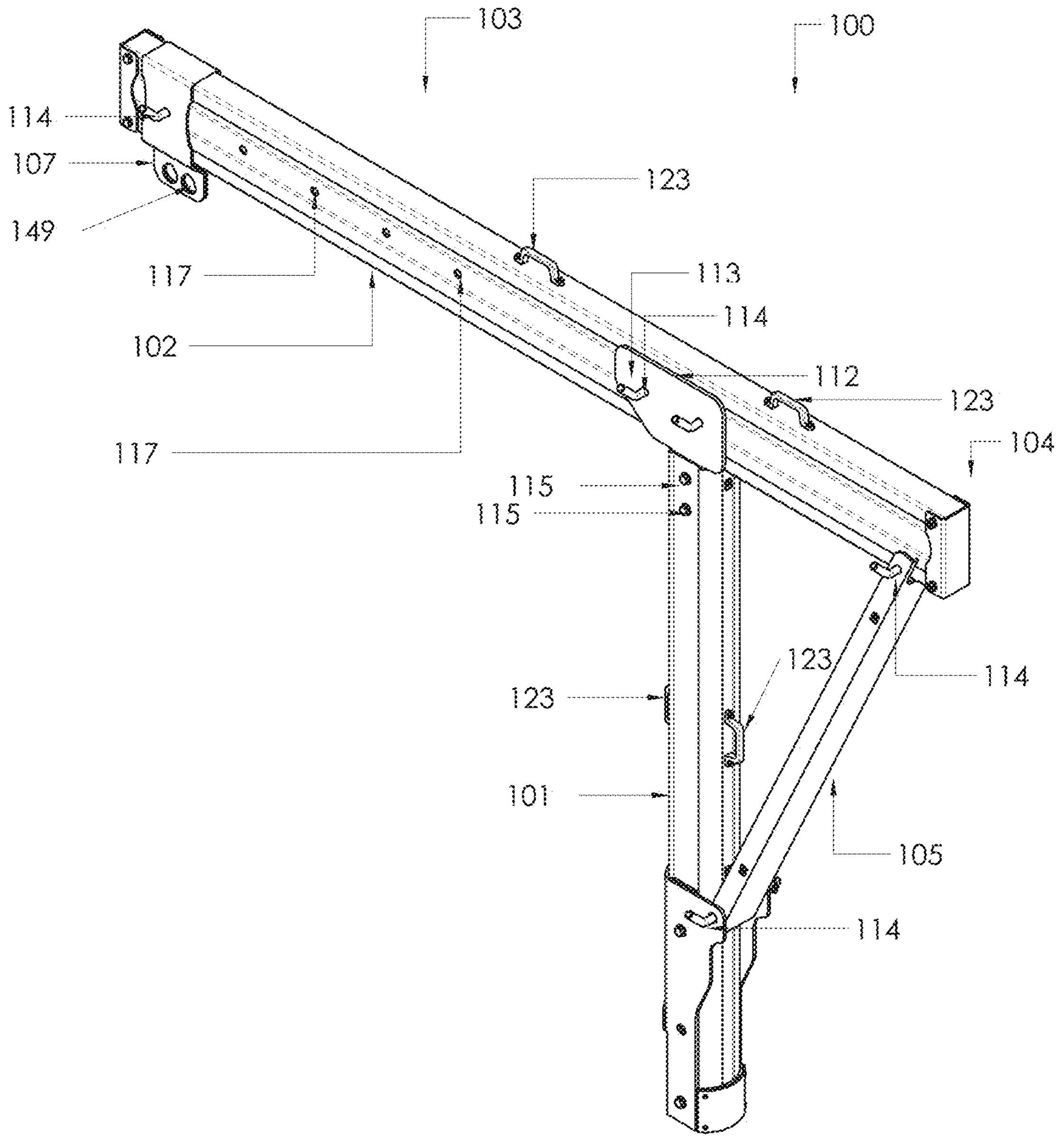
FIG. 1 shows a perspective view of a davit assembly in accordance with an embodiment.

A davit assembly 100 comprises a vertical structural column 101 connecting a horizontal structural beam 102 between a longer forward beam portion 103 and a shorter rearward beam portion 104 thereof.

A rearward angled brace 105 is tensioned between a lower region of the structural column 101 and an end of the rearward beam portion 104. A mounting base 106 (depicted A to D in FIGS. 4-7) engages a lower end of the structural column 101.

A primary rigging anchor 107 slidably engages along the forward beam portion 103. The primary rigging anchor 107 may comprise a pair of eyelets 149 for engaging the fall arresting or load lifting and lowering rope.

Figure 9:
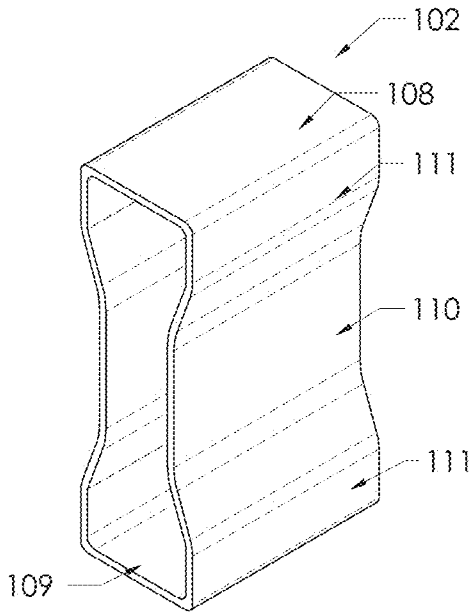
FIG. 9 shows a cross-section of the structural beam in accordance with an embodiment.

FIG. 9 shows a cross-section of the horizontal structural beam 102 which is substantially a flattened hourglass shape aluminium extrusion. Specifically, symmetrical the cross-section may comprise a planar upper 108, a planar lower 109 and sides therebetween, each side having a planar indented central channel portion 110 between adjacent planar portions 111. The structural beam 102 may be manufactured of aluminium extrusion.

The primary rigging anchor 107 may be manufactured of high tensile stainless steel and slidably accommodate the structural beam 102 therethrough. In this regard, the rigging anchor 107 may comprise a rectangular shape, thereby conforming to contact external surfaces with the structural beam 102 therein. The structural beam 102 may comprise a plurality of apertures 117 therealong and the rigging anchor 107 may comprise a safety locking pin 114 therethrough to securely fix the rigging anchor 107 in selected positions along the forward beam portion 103.

The safety locking pin 114 may comprise a shaft being bent at a proximal end thereof and which has a round aperture through a distal end thereof for a security locking ring pin 116. The same locking pin 114 and security locking ring pin 116 may be used throughout the assembly 100.

Figure 10:
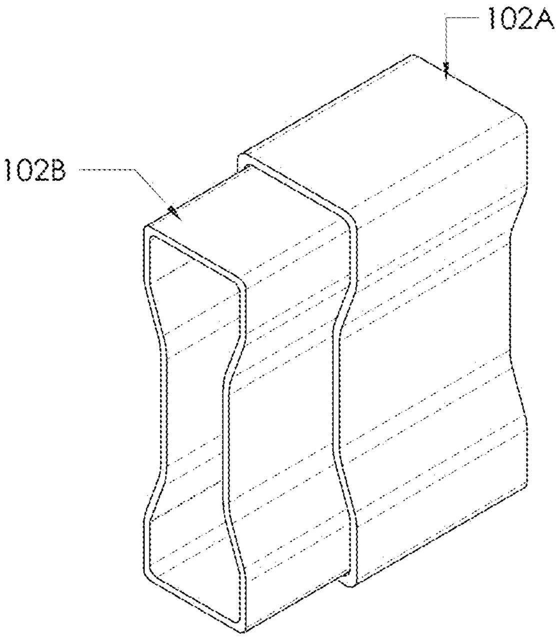
FIG. 10 shows a cross-sectional telescopic structural beam arrangement in accordance with an embodiment.
Figure 11:
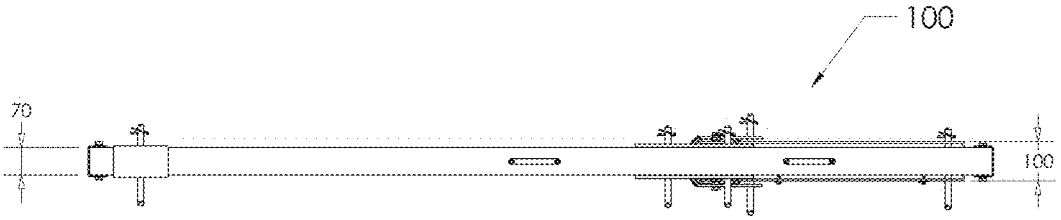
FIG. 11 shows a top plan view of the davit assembly giving exemplary dimensions.
Figure 12:
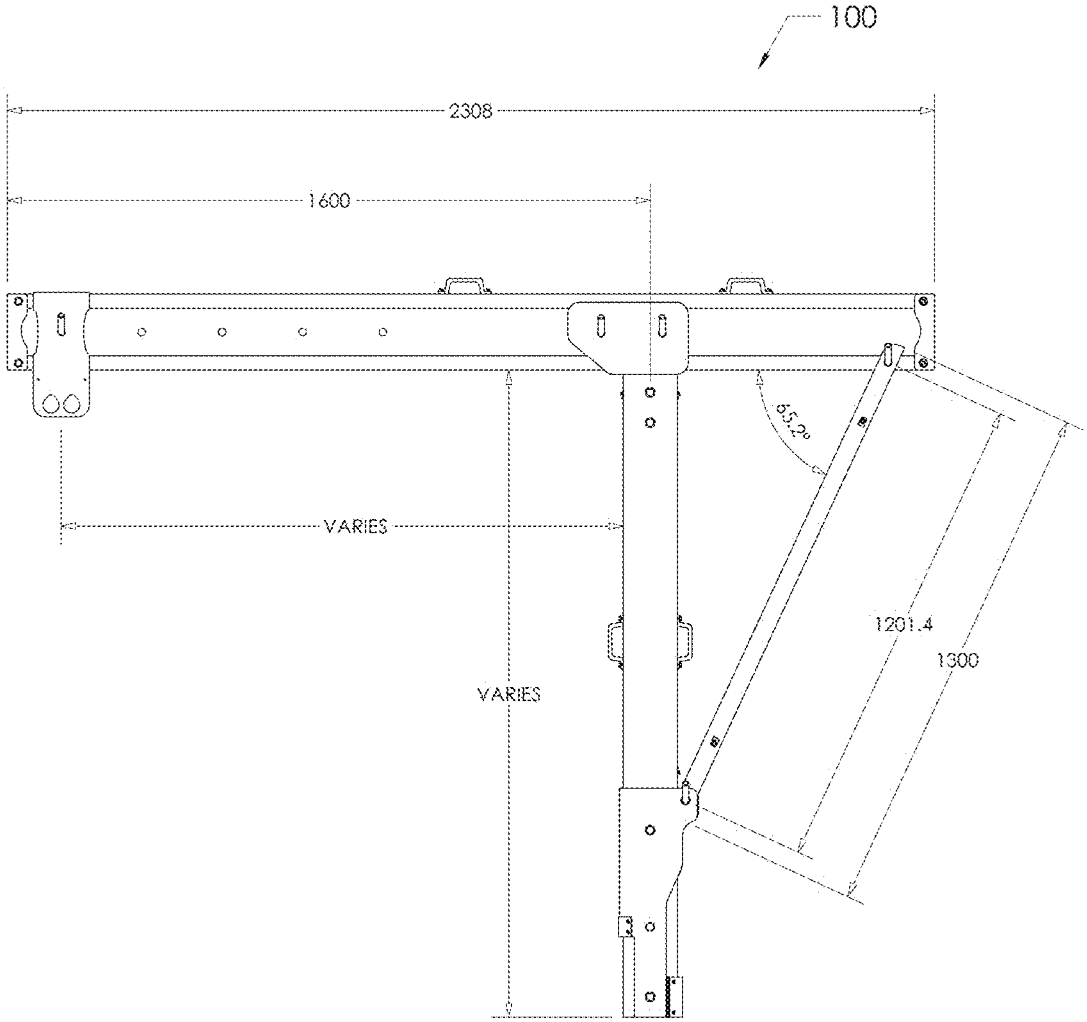
FIG. 12 shows typical a side elevation view of the davit assembly giving exemplary dimensions.
Figure 13:
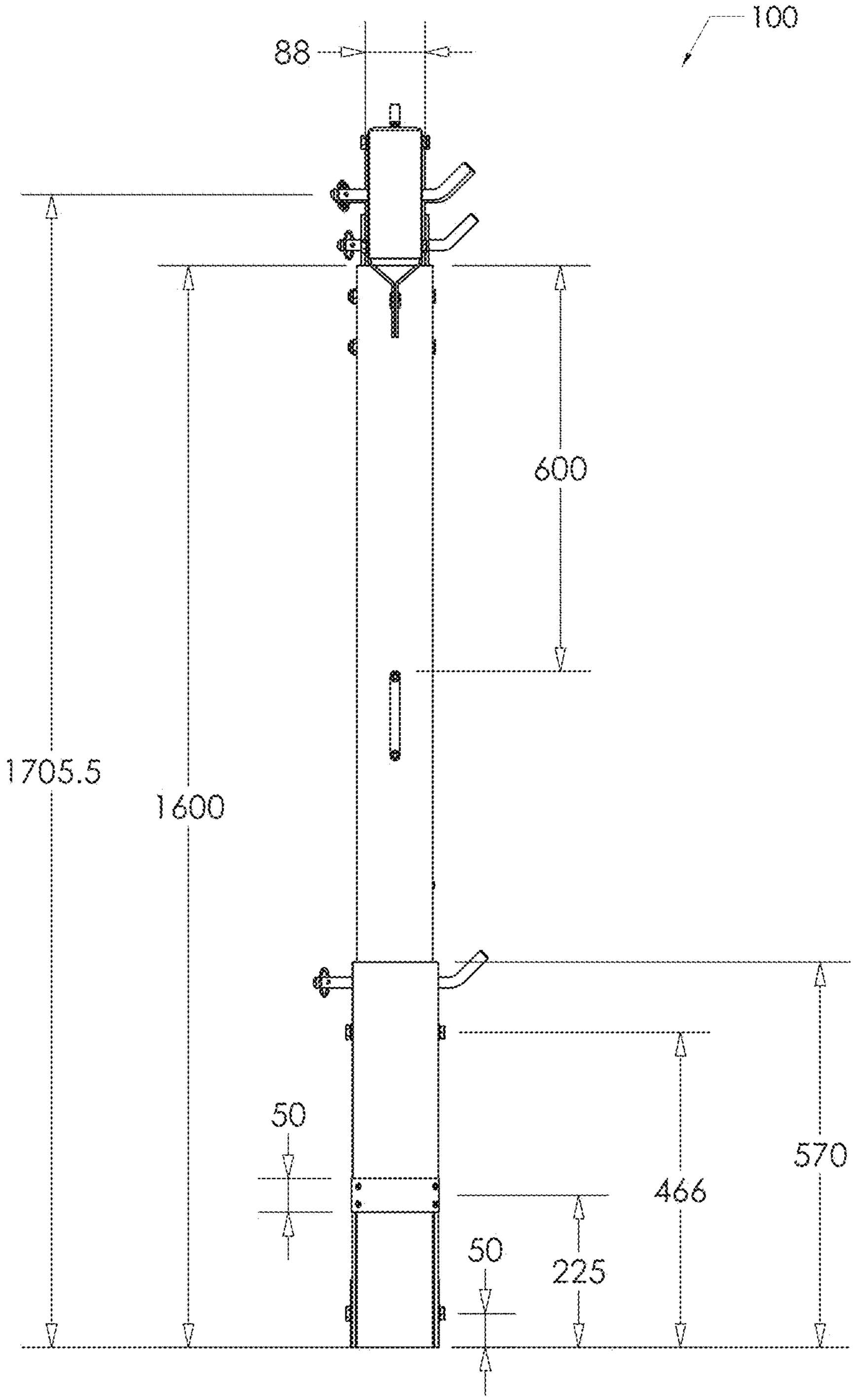
FIG. 13 shows a front elevation view of the davit assembly giving exemplary dimensions.
Figure 14:
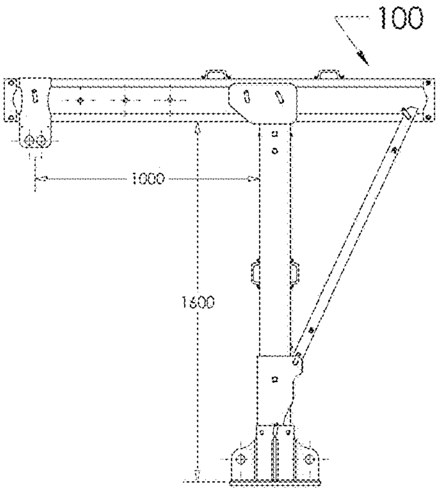
FIGS. 14-16 show typical side elevation views of the davit assembly of differing dimensions.
Figure 15:
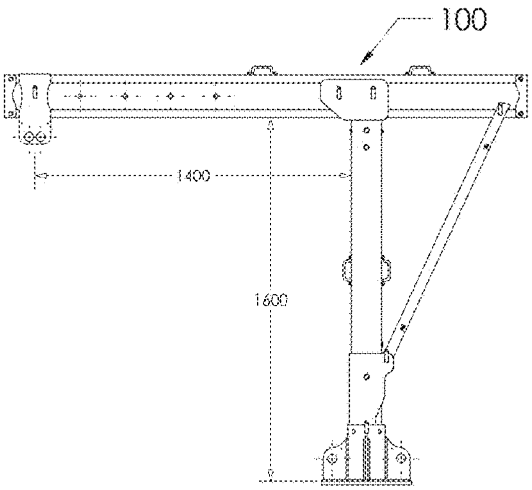
Figure 16:
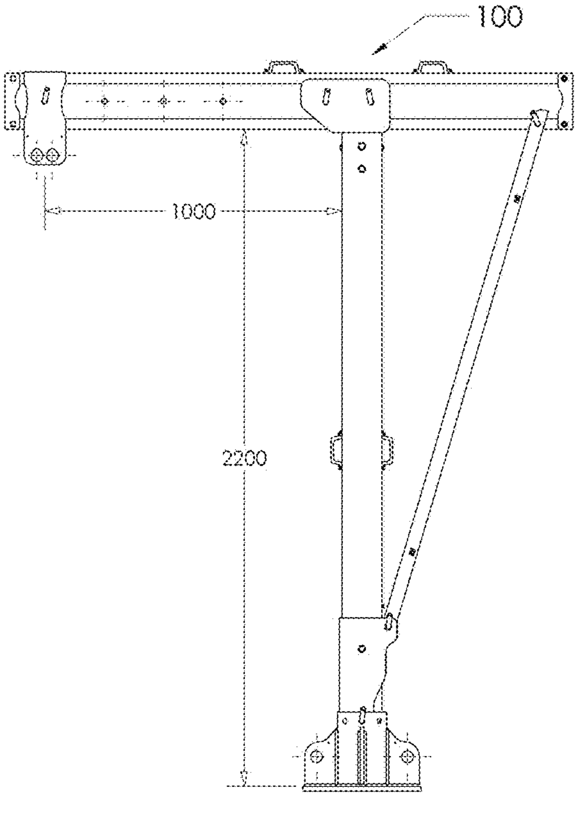

In embodiments, the structural beam 102 may be telescopic wherein the beam 102 comprises the telescopic arrangement shown in FIG. 10 comprising a major beam 102A slidably retaining a minor beam 102B therein. Typically, the minor beam 102B would form the distal end of forward beam portion 103. The offset between the major and minor beams 102A and 102B may be fixed using a series of apertures and common safety locking pins (not shown) therethrough.

Figure 8:
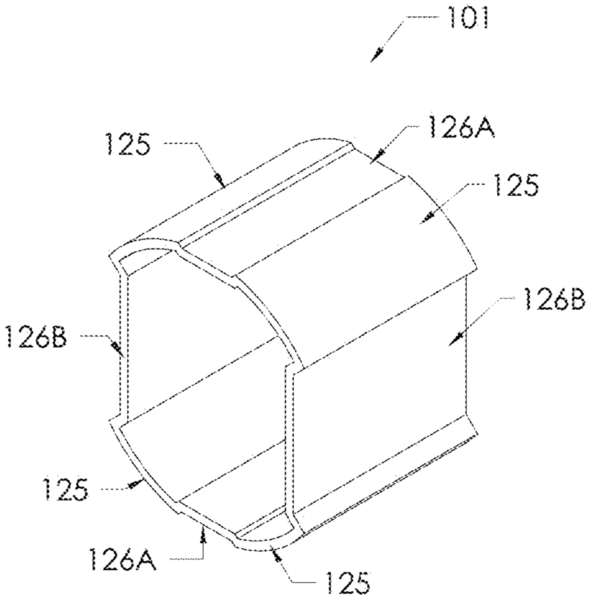
FIG. 8 shows a cross-section of the structural column in accordance with an embodiment.

FIG. 8 shows a cross-section of the structural column 101 in accordance with a preferred embodiment which comprises symmetrical circular circumscribing rounded corners 125 and recessed planar portions 126 therebetween. The planar portions 126 may comprise narrowed upper and lower portions 126A and wider side portions 126B. The structural column 101 may be manufactured of aluminium extrusion.

Figure 2:
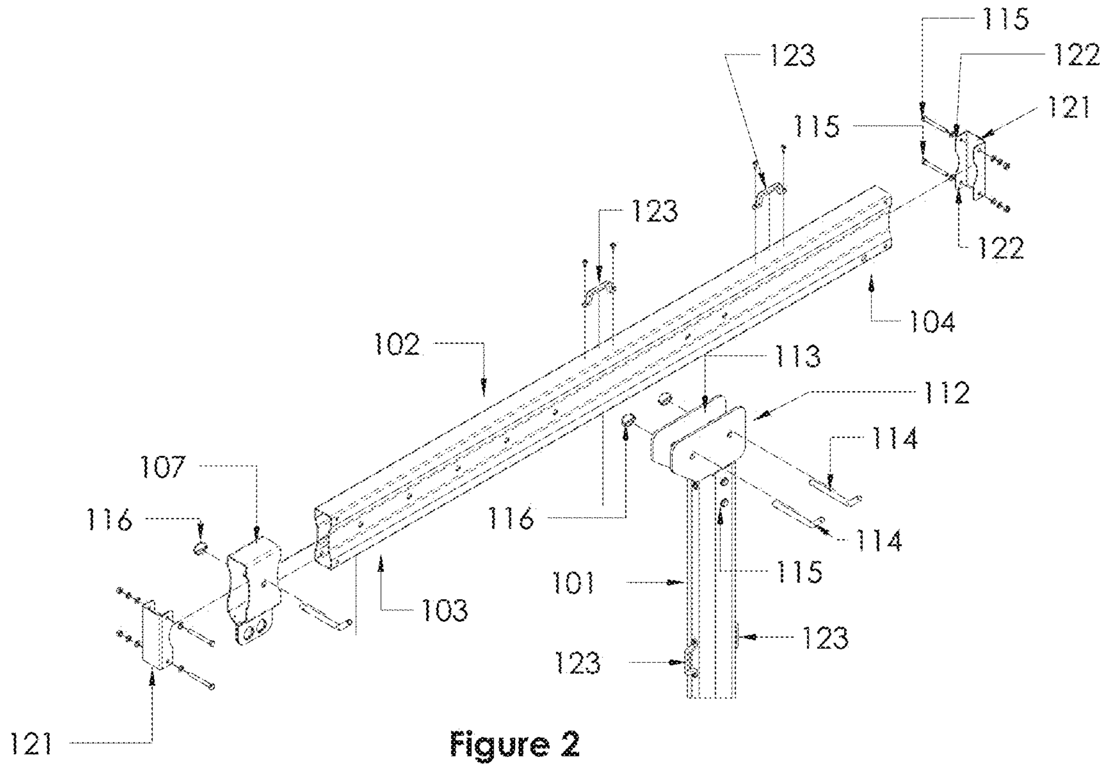
FIG. 2 shows a top disassembled perspective view of the davit assembly.

With reference to FIG. 2, the structural column 101 may be connected to the structural beam 102 by structural connector 112 which may comprise a pair of side plates 113 which engage either side of the structural beam 102 and which is affixed thereto by a pair of common safety locking pins 114 therethrough. Each plate 113 may comprise a pair of lower plates which insert within the upper end of the structural column 101 and which are affixed thereto using fasteners 115. The fasteners 115 may go through the planar wider side portions 126B. The structural connector 112 may be manufactured of high tensile stainless steel.

Figure 3:
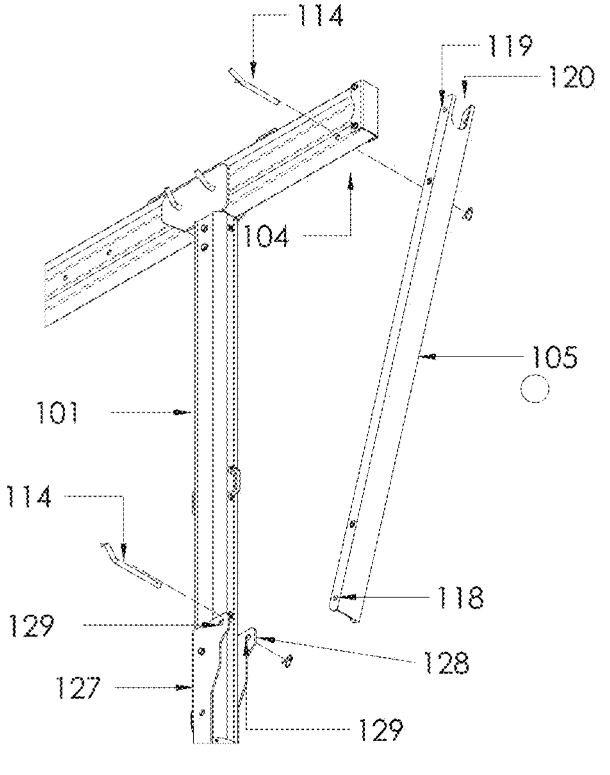
FIG. 3 shows a bottom disassembled perspective view of the davit assembly.

With reference to FIG. 3, the angled brace 105 may be a C-channel profile manufactured of high tensile stainless steel and which may comprise lower end apertures 118 for a lower end common safety locking pin 114 and upper end apertures 119 for an upper end common safety locking pin 114. The upper end of the support brace 105 may comprise a cutout 120 to engage a lower end of the rearward beam portion 104 therein. A support jacket 127 may engage around the lower region of the structural column 101 extending planar side flanges 128 having a pair of apertures 129 therein for a lower end locking pin 114.

With reference to FIG. 2, an end cap 121 may terminate the end of the rearward beam portion 104. The end cap 121 with planar side flanges may be a C-channel profile manufactured of high tensile stainless steel and which may comprise upper and lower apertures 122 for a pair of fasteners 115 therethrough. A further identical end cap 121 may terminate the end of the forward beam portion 103.

The assembly 100 may incorporate carry handles 123 which, with reference to FIG. 1, may locate on an upper surface of the structural beam 102 either side of the structural column 101 and furthermore either side of the structural column 101 substantially at a midpoint thereof.

With reference to FIGS. 4-7, the various mounting bases 106 A-D may comprise a cylindrical engagement 124 which engages a lower end of the structural column 101 therein. As alluded to in FIG. 8 above, the symmetrical rounded corners 125 of the structural column 101 may circumscribe a cylindrical cross-section, thereby allowing the structural column 101 to rotate through 360° within the cylindrical engagement 124. The mounting bases 106 may be of a welded construction and may be manufactured from high tensile mild steel.

The cylindrical engagement 124 may comprise a plurality of radially spaced apertures 130 for a common safety locking pin 114 to engage the structural column 101 at a chosen rotational offset to set the radial angle of the forward beam portion 103. The apertures 130 may be arranged such that the structural beam 102 can operate at 0° and 35° and 65° either side of the central position, thereby providing a total operative range of 130°.

Figure 4:
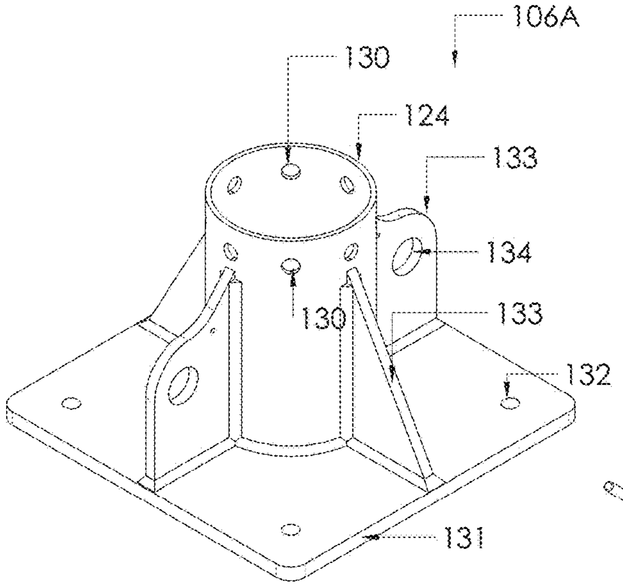
FIG. 4 shows a mounting base for surface mounting in accordance with an embodiment.

FIG. 4 shows a floor mounting base 106A to concrete or steel. The mounting base 106A comprises a base plate 131 and a plurality of apertures 132 therethrough for floor fixing high tensile fasteners therethrough. Gusset plates 133 support and reinforce the cylindrical engagement 124 laterally with respect to the baseplate 131. Opposite gusset plates 133 may comprise connection apertures 134 therethrough such as for connecting of steel wire lanyards, carabiners and the like.

Figure 5:
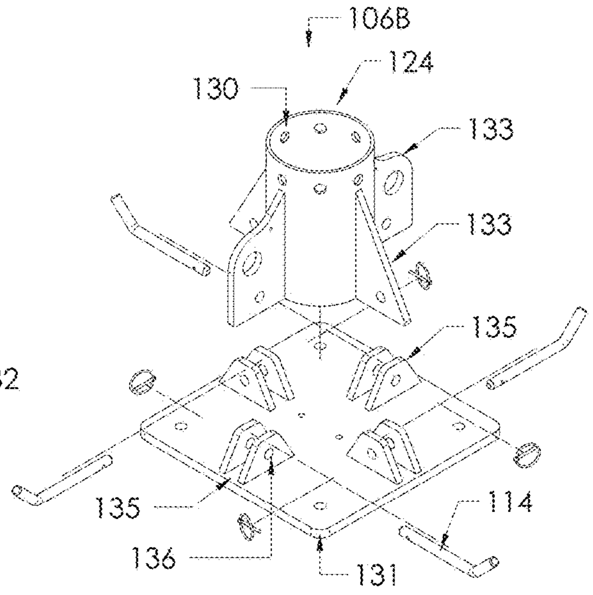
FIG. 5 shows a mounting base for low profile surface mounting in accordance with an embodiment.

FIG. 5 shows a low profile mounting base 106B wherein the cylindrical engagement 124 is removable. The mounting base 106B comprises the baseplate 131 and a quadrant of tab pairs 135 which engage the lower ends of the gusset plates 133 therebetween and which have apertures 136 therethrough for removable receipt of common safety locking pins 114. As such, for removal relocation, the locking pins 114 may be retracted to release the cylindrical engagement 124 from the baseplate 131.

Figure 6:
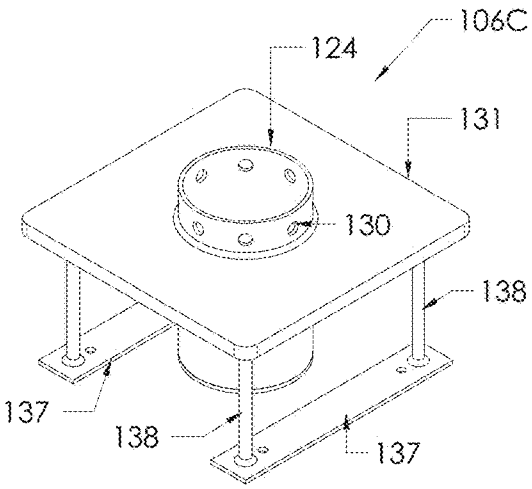
FIG. 6 shows a mounting base for concrete cast-in mounting in accordance with an embodiment.

FIG. 6 shows a mounting base 106C for casting into concrete. The mounting base 106C comprises a baseplate 131 but wherein the cylindrical engagement 124 is recessed and welded therein, whilst yet exposing the radial arrangement of apertures 130. Horizontal cast-in anchor plates 137 may be attached beneath the baseplate 131 by means of vertical anchor rods 138.

Figure 7:
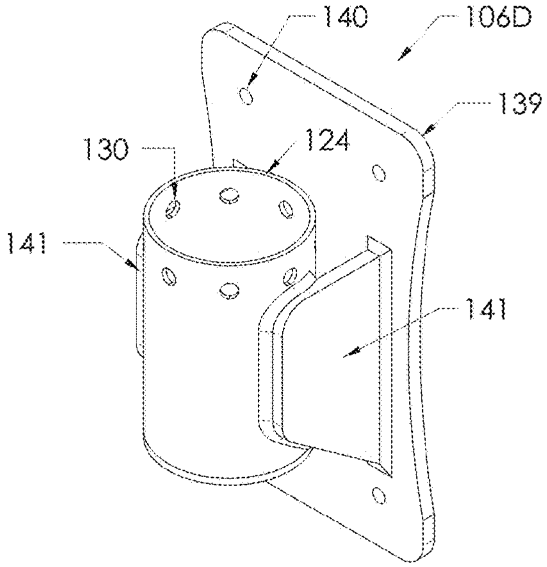
FIG. 7 shows a wall mounting base in accordance with an embodiment.

FIG. 7 shows a wall mounting base 106D which comprises a base plate 139 having a plurality of apertures 140 therethrough for wall fixing high tensile fasteners therethrough. The mounting base 106D supports the cylindrical engagement 124 parallel to the wall mounting baseplate 139 by a pair of side flanged gusset plates 141 welded between corresponding sides of the cylindrical engagement 124 and the wall mounting baseplate 139.

Figures 17, 18:
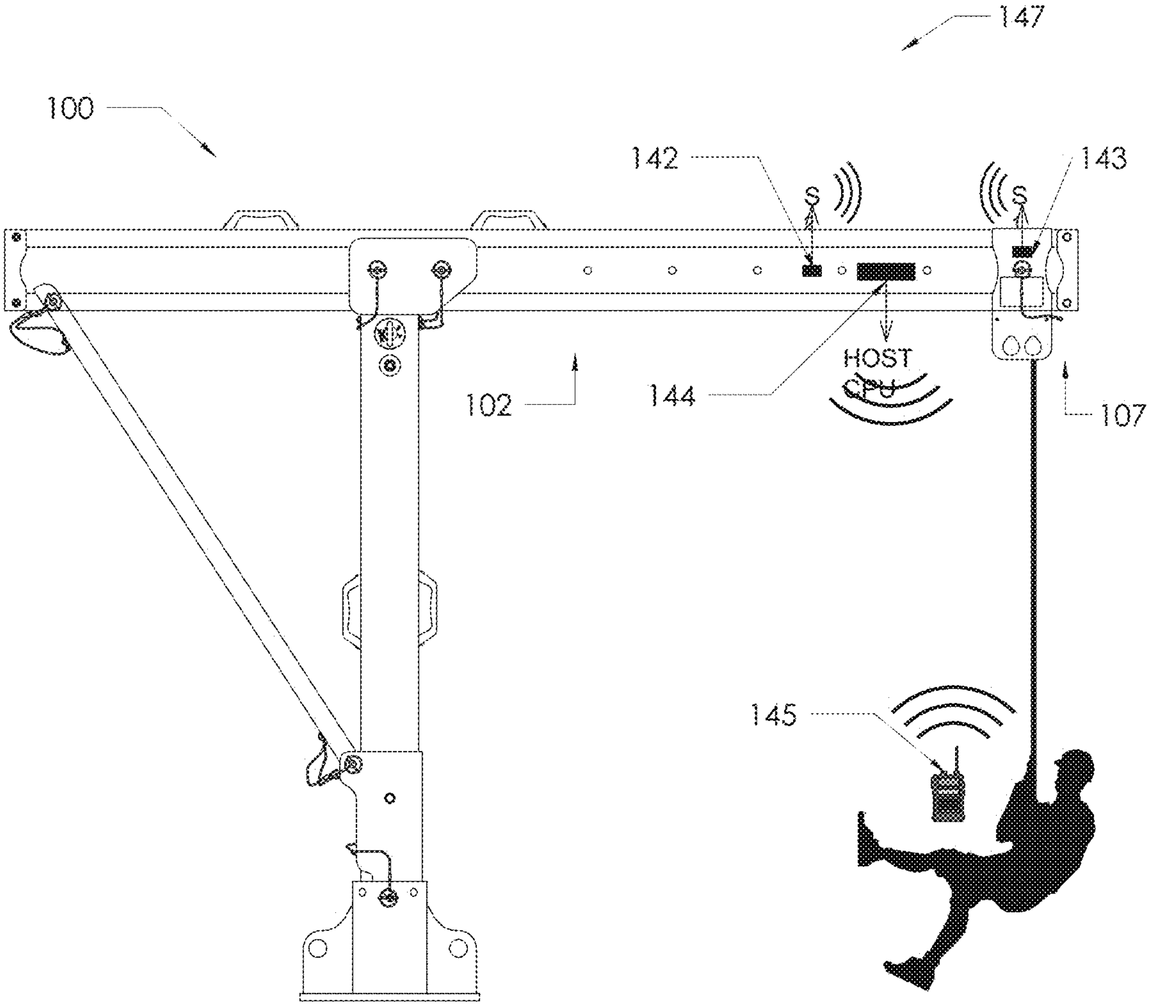
FIG. 17 shows a safety monitoring system of the davit assembly.
FIG. 18 shows a set-point table applied by the safety monitoring system for detecting unsafe operation of the assembly.

FIG. 17 illustrates the davit assembly 100 incorporating a safety monitoring system 147 comprising an inclinometer 142 which measures the angle of deviation of the structural beam 102 under load and a strain gauge 143 which measures load applied to the primary rigging anchor 107.

A host CPU 144 continuously monitors sensor readings from the inclinometer 142 and strain gauge 143 and may apply the set-point table 146 of FIG. 18 to determine safe operation of the assembly 100. The host CPU 144 may apply a threshold to deflection angle and load condition readings from the inclinometer 142 and strain gauge 143 respectively to resolve the readings into binary format. The set-point table 146 may apply AND logic to these binary readings wherein if both the angle of deviation measured by the inclinometer 142 and load condition measured by the strain gauge 143 exceeds their respective thresholds, the output of the set-point table 146 is elevated whereafter the host CPU 144 transmits a warning signal to the receiver unit 145 which may output an audible alarm of overloaded or unsafe operation.

The host CPU 144 may communicate wirelessly with the inclinometer 142 and strain gauge 143. Furthermore, the host CPU 144 may communicate wirelessly with a receiver unit 145 held by the operator.

The foregoing description, for purposes of explanation, used specific nomenclature to provide a thorough understanding of the invention. However, it will be apparent to one skilled in the art that specific details are not required in order to practise the invention. Thus, the foregoing descriptions of specific embodiments of the invention are presented for purposes of illustration and description. They are not intended to be exhaustive or to limit the invention to the precise forms disclosed as obviously many modifications and variations are possible in view of the above teachings. The embodiments were chosen and described in order to best explain the principles of the invention and its practical applications, thereby enabling others skilled in the art to best utilise the invention and various embodiments with various modifications as are suited to the particular use contemplated. It is intended that the following claims and their equivalents define the scope of the invention.

The invention claimed is:

1. A davit assembly comprising a vertical structural column connecting a horizontal structural beam between a longer forward beam portion and a shorter rearward beam portion thereof, an angled support brace tensioned between a lower region of the structural column and an end of the shorter rearward beam portion and a primary rigging anchor slidably engaging the forward beam portion, wherein:

- the primary rigging anchor slidably accommodates the forward beam portion therethrough; and
- the horizontal structural beam is hollow and comprises a symmetrical cross-section having a planar upper and a planar lower and sides therebetween, each having a planar indented central channel portion therealong.

2. The davit assembly as claimed in claim 1, wherein the structural beam comprises a plurality of apertures therealong and the rigging anchor comprises a safety locking pin therethrough to securely fix the rigging anchor in selected positions along the forward beam portion.

3. The davit assembly as claimed in claim 1, wherein the rigging anchor comprises a rectangular shape conforming to the planar sides of the structural beam therein.

4. The davit assembly as claimed in claim 1, wherein common locking pins connect the structural column to the structural beam and the angled support brace between the structural column and the structural beam.

5. The davit assembly as claimed in claim 1, wherein the horizontal structural beam comprises a telescopic arrangement of major and minor beams.

6. The davit assembly as claimed in claim 5, wherein an offset between the major and minor beams is fixed using a series of respective collocating apertures and a safety locking pin therethrough.

7. The davit assembly as claimed in claim 5, wherein the major and minor beams each comprise a symmetrical cross-section having a planar upper and a planar lower and sides therebetween, each having a planar indented central channel portion therealong.

8. The davit assembly as claimed in claim 1, wherein the vertical structural column comprises a symmetrical cross-section having circular circumscribing rounded corners and recessed planar portions therebetween.

9. The davit assembly as claimed in claim 8, wherein the planar portions comprise relatively narrow upper and lower portions and relatively wider side portions.

10. The davit assembly as claimed in claim 8, further comprising a mounting base which comprises a cylindrical engagement which engages a lower end of the structural column therein.

11. The davit assembly as claimed in claim 10, wherein the circular circumscribing rounded corners allow the structural column to rotate through 360° within the cylindrical engagement.

12. The davit assembly as claimed in claim 11, wherein the cylindrical engagement comprises a plurality of radially spaced apertures for a locking pin to engage the structural column at a chosen rotational offset to set the radial angle of the forward beam portion.

13. The davit assembly as claimed in claim 12, wherein the apertures are arranged such that the structural beam can be engaged at a central position and approximately 65° either side of the central position, thereby providing a total operative range of approximately 130°.

14. The davit assembly as claimed in claim 13, wherein the apertures are arranged such that the structural beam can be further engaged at approximately 35° either side of the central position.

15. The davit assembly as claimed in claim 10, wherein the mounting base comprises a base plate and a plurality of apertures therethrough for floor fixing high tensile fasteners therethrough.

16. The davit assembly as claimed in claim 15, wherein the mounting base comprises gusset plates laterally reinforcing the cylindrical engagement with respect to the base plate.

17. The davit assembly as claimed in claim 15, wherein the cylindrical engagement is removable from the base plate.

18. The davit assembly as claimed in claim 15, wherein the cylindrical engagement is recessed in the base plate.

19. The davit assembly as claimed in claim 15, wherein the mounting base supports the cylindrical engagement parallel to the base plate.

20. The davit assembly as claimed in claim 19, wherein the mounting base supports the cylindrical engagement parallel to the base plate by a pair of side flanged gusset plates welded between corresponding sides of the cylindrical engagement and the mounting base.

21. The davit assembly as claimed in claim 18, wherein the cylindrical engagement exposes the radial arrangement of apertures above the base plate.

22. The davit assembly as claimed in claim 18, wherein the mounting base further comprises horizontal cast-in anchor plates attached beneath the base plate by vertical anchor rods.

23. The davit assembly as claimed in claim 17, wherein the base plate has a quadrant of tab pairs which engage lower ends of respective gusset plates therebetween and which have apertures therethrough for removable receipt of locking pins.

24. The davit assembly as claimed in claim 16, wherein the gusset plates comprise at least one connection aperture therethrough.

25. The davit assembly as claimed in claim 1, wherein the structural column is connected to the structural beam by structural connector which comprises a pair of side plates which engage either side of the structural beam.

26. The davit assembly as claimed in claim 25, wherein the pair of side plates are affixed either side of the structural beam by a pair of locking pins therethrough.

27. The davit assembly as claimed in claim 25, wherein each plate comprises a pair of lower plates which insert within an upper end of the structural column, and which are affixed thereto using fasteners.

28. The davit assembly as claimed in claim 27, wherein the vertical structural column comprises a symmetrical cross-section having circular circumscribing rounded corners and recessed planar portions therebetween and wherein the fasteners go through opposite planar portions.

29. The davit assembly as claimed in claim 28, wherein the planar portions comprise relatively narrow upper and lower portions and relatively wider side portions and wherein the fasteners go through the planar wider side portions.

30. The davit assembly as claimed in claim 1, wherein the angled support brace comprises a C-channel profile.

31. The davit assembly as claimed in claim 30, wherein an upper end of the support brace comprises a cutout to engage a lower end of the rearward beam portion therein.

32. The davit The assembly as claimed in claim 1, wherein the angled support brace comprises lower end apertures for a lower end locking pin and upper end apertures for an upper end locking pin.

33. The davit assembly as claimed in claim 32, wherein a support jacket engages around the lower region of the structural column extending planar side flanges having a pair of apertures for the lower end locking pin.

34. The davit assembly as claimed in claim 1, wherein an end cap terminates at least one end of the structural beam.

35. The davit assembly as claimed in claim 34, wherein the end cap comprises planar side flanges.

36. The davit assembly as claimed in claim 35, wherein the planar side flanges comprise upper and lower apertures for a pair of fasteners therethrough.

37. The davit assembly as claimed in claim 1, further comprising a safety monitoring system comprising an inclinometer measuring an angle of deviation of the structural beam and a strain gauge measuring load applied to the primary rigging anchor and a host CPU which detects unsafe operation of the assembly when an angle of deviation and measured load exceed respective set-point thresholds.

38. The davit assembly as claimed in claim 37, wherein, when the angle of deviation and measured load exceed respective set-point thresholds, the host CPU transmits a warning signal to an operator receiver unit.

39. The davit assembly as claimed in claim 38, wherein the host CPU communicates wirelessly with the operator receiver unit.

40. The davit e assembly as claimed in claim 38, wherein the receiver unit outputs an audible alarm.

41. The davit assembly as claimed in claim 38, wherein the host CPU communicates wirelessly with at least one of the inclinometer and the strain gauge.

42. A davit assembly comprising a vertical structural column connecting a horizontal structural beam between a longer forward beam portion and a shorter rearward beam portion thereof, an angled support brace tensioned between a lower region of the structural column and an end of the shorter rearward beam portion and a primary rigging anchor slidably engaging the forward beam portion wherein the vertical structural column comprises a symmetrical cross-section having circular circumscribing rounded corners and recessed planar portions therebetween.

43. A davit assembly comprising a vertical structural column connecting a horizontal structural beam between a longer forward beam portion and a shorter rearward beam portion thereof, an angled support brace tensioned between a lower region of the structural column and an end of the shorter rearward beam portion and a primary rigging anchor slidably engaging the forward beam portion wherein the angled support brace comprises lower end apertures for a lower end locking pin and upper end apertures for an upper end locking pin.

* * * * *